(12) United States Patent
Jalali (10) Patent No.: US 6,778,507 B1
(45) Date of Patent: Aug. 17, 2004

(54) METHOD AND APPARATUS FOR BEAMFORMING IN A WIRELESS COMMUNICATION SYSTEM

(75) Inventor: Ahmad Jalali, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/388,267

(22) Filed: Sep. 1, 1999

(51) Int. Cl.[7] .................................................. H04B 7/00
(52) U.S. Cl. ........................ 370/317; 370/328; 370/441
(58) Field of Search ................................ 370/203, 206, 370/207, 209, 215, 252, 276, 277, 280, 281, 294, 295, 310, 319, 320, 330, 335–337, 342–347, 350, 441–443, 478–480, 498, 500, 515, 915, 334; 455/562, 210, 315, 317, 318, 319, 328, 332, 333, 334, 350

(56) References Cited

U.S. PATENT DOCUMENTS

| | | | | |
|---|---|---|---|---|
| 4,809,205 A | * | 2/1989 | Freeman | 708/276 |
| 4,901,307 A | | 2/1990 | Gilhousen et al. | |
| 5,103,459 A | * | 4/1992 | Gilhousen et al. | 370/206 |
| 5,267,261 A | * | 11/1993 | Blakeney et al. | 370/332 |
| 5,504,773 A | | 4/1996 | Padovani et al. | |
| 5,519,710 A | * | 5/1996 | Otsuka | 370/337 |
| 5,625,876 A | | 4/1997 | Gilhousen et al. | |
| 5,754,139 A | * | 5/1998 | Turcotte et al. | 342/373 |
| 5,933,462 A | | 8/1999 | Viterbi et al. | |
| 6,021,164 A | * | 2/2000 | Park | 375/344 |
| 6,104,935 A | * | 8/2000 | Smith et al. | 455/562.1 |
| 6,381,265 B1 | * | 4/2002 | Hessel et al. | 375/219 |
| 6,397,070 B1 | * | 5/2002 | Black | 455/453 |
| 6,574,211 B2 | * | 6/2003 | Padovani et al. | 370/347 |
| 6,643,526 B1 | * | 11/2003 | Katz | 455/277.2 |
| 2001/0012785 A1 | * | 8/2001 | Esteves et al. | 455/522 |
| 2002/0047800 A1 | * | 4/2002 | Proctor et al. | 342/367 |

FOREIGN PATENT DOCUMENTS

| | | | | |
|---|---|---|---|---|
| EP | 0807989 | | 11/1997 | |
| EP | 0 807 989 | * | 11/1997 | H01Q/3/26 |

OTHER PUBLICATIONS

Aste, et al. "Downlink Beamforming for Cellular Mobile Communications (GSM System)" Annals of Telecommunications 53(11/12): 435–448 (1998).

* cited by examiner

*Primary Examiner*—Chi Pham
*Assistant Examiner*—Anh Vu Ly
(74) *Attorney, Agent, or Firm*—Philip Wadsworth; Sandra L. Godsey; Byron Yafuso (57) ABSTRACT

In a CDMA data communication system capable of variable rate transmission, utilization of beamforming techniques decreases the average interference caused by transmissions of a base station to subscriber stations in neighboring cells. Base stations utilize multiple transmit antennas, each transmitting signals at controlled phases, to form transmit signal beams corresponding to individual subscriber stations. Data and reference signals are transmitted along beams that change according to fixed time slots and sub-slots in order to maximize carrier-to-interference ratios (C/I) measured at subscriber stations.

35 Claims, 5 Drawing Sheets

METHOD AND APPARATUS FOR BEAMFORMING IN A WIRELESS COMMUNICATION SYSTEM

BACKGROUND OF THE INVENTION

I. Field of the Invention

The current invention relates to wireless data communication. More particularly, the present invention relates to a novel and improved method and apparatus for high rate packet data transmission in a wireless communication system.

II. Description of the Related Art

A modern day communication system is required to support a variety of applications. One such communication system is a code division multiple access (CDMA) system which conforms to the "TIA/EIA/IS-95 Mobile Station-Base Station Compatibility Standard for Dual-Mode Wideband Spread Spectrum Cellular System," hereinafter referred to as the IS-95 standard. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated by reference herein.

In this specification, base station refers to the hardware with which the subscriber stations communicate. Cell refers to the hardware or the geographic coverage area, depending on the context in which the term is used. A sector is a partition of a cell. Because a sector of a CDMA system has the attributes of a cell, the teachings described in terms of cells are readily extended to sectors.

In a CDMA system, communications between users are conducted through one or more base stations. A first user on one subscriber station communicates to a second user on a second subscriber station by transmitting data on the reverse link to a base station. The base station receives the data and can route the data to another base station. The data is transmitted on the forward link of the same base station, or a second base station, to the second subscriber station. The forward link refers to transmission from the base station to a subscriber station and the reverse link refers to transmission from the subscriber station to a base station. In IS-95 systems, the forward link and the reverse link are allocated separate frequencies.

The subscriber station communicates with at least one base station during a communication. CDMA subscriber stations are capable of communicating with multiple base stations simultaneously during soft handoff. Soft handoff is the process of establishing a link with a new base station before breaking the link with the previous base station. Soft handoff minimizes the probability of dropped calls. The method and system for providing a communication with a subscriber station through more than one base station during the soft handoff process are disclosed in U.S. Pat. No. 5,267,261, entitled "MOBILE ASSISTED SOFT HANDOFF IN A CDMA CELLULAR TELEPHONE SYSTEM," assigned to the assignee of the present invention and incorporated by reference herein. Softer handoff is the process whereby the communication occurs over multiple sectors which are serviced by the same base station. The process of softer handoff is described in detail in copending U.S. Pat. No. 5,625,876, entitled "METHOD AND APPARATUS FOR PERFORMING HANDOFF BETWEEN SECTORS OF A COMMON BASE STATION," assigned to the assignee of the present invention and incorporated by reference herein Given the growing demand for wireless data applications, the need for very efficient wireless data communication systems has become increasingly significant. The IS-95 standard is capable of transmitting traffic data and voice data over the forward and reverse links. A method for transmitting traffic data in code channel frames of fixed size is described in detail in U.S. Pat. No. 5,504,773, entitled "METHOD AND APPARATUS FOR THE FORMATTING OF DATA FOR TRANSMISSION," assigned to the assignee of the present invention and incorporated by reference herein. In accordance with the IS-95 standard, the traffic data or voice data is partitioned into code channel frames which are 20 msec wide with data rates as high as 14.4 Kbps.

A significant difference between voice services and data services is the fact that the former imposes stringent and fixed delay requirements. Typically, the overall one-way delay of speech frames must be less than 100 msec. In contrast, the data delay can become a variable parameter used to optimize the efficiency of the data communication system. Specifically, more efficient error correcting coding techniques which require significantly larger delays than those that can be tolerated by voice services can be utilized. An exemplary efficient coding scheme for data is disclosed in U.S. Pat. No. 5,933,462, entitled "SOFT DECISION OUTPUT DECODER FOR DECODING CONVOLUTIONALLY ENCODED CODEWORDS," assigned to the assignee of the present invention and incorporated by reference herein.

Another significant difference between voice services and data services is that the former requires a fixed and common grade of service (GOS) for all users. Typically, for digital systems providing voice services, this translates into a fixed and equal transmission rate for all users and a maximum tolerable value for the error rates of the speech frames. In contrast, for data services, the GOS can be different from user to user and can be a parameter optimized to increase the overall efficiency of the data communication system. The GOS of a data communication system is typically defined as the total delay incurred in the transfer of a predetermined amount of data, hereinafter referred to as a data packet.

Yet another significant difference between voice services and data services is that the former requires a reliable communication link which, in the exemplary CDMA communication system, is provided by soft handoff. Soft handoff results in redundant transmission s from two or more base stations to improve reliability. However, this additional reliability is not required for data transmission because the data packets received in error can be retransmitted. For data services, the transmit power used to support soft handoff can be more efficiently used for transmitting additional data.

The parameters which measure the quality and effectiveness of a data communication system are the transmission delay required to transfer a data packet and the average throughput rate of the system. Transmission delay does not have the same impact in data communication as it does for voice communication, but it is an important metric for measuring the quality of the data communication system. The average throughput rate is a measure of the efficiency of the data transmission capability of the communication system.

It is well known that in cellular systems the carrier-to-interference ratio C/I of any given user is a function of the location of the user within the coverage area. In order to maintain a given level of service, TDMA and FDMA systems resort to frequency reuse techniques, i.e. not all frequency channels and/or time slots are used in each base station. In a CDMA system, the same frequency allocation is reused in every cell of the system, thereby improving the overall efficiency. The C/I that any given user's subscriber station determines the information rate that can be supported for this particular link from the base station to the user's subscriber station. Given the specific modulation and error correction method used for the transmission, which the present invention seeks to optimize for data transmissions, a given level of performance is achieved at a corresponding level of C/I. For idealized cellular system with hexagonal cell layouts and utilizing a common frequency in every cell, the distribution of C/I achieved within the idealized cells can be calculated. An exemplary system for transmitting high rate digital data in a wireless communication system is disclosed in copending U.S. patent application Ser. No. 08/963,386, entitled "METHOD AND APPARATUS FOR HIGHER RATE PACKET DATA TRANSMISSION," (hereafter the '386 application), now U.S. Pat. No. 6,574,211, issued on Jun. 3, 2003 to Padovani et al., assigned to the assignee of the present application and incorporated by reference herein.

It is also well known that much of the signal interference in a loaded CDMA system is caused by transmitters belonging to the same CDMA system. In an effort to increase capacity, cells are often divided into sectors or smaller cells operating at lower power, but such methods are costly and difficult to apply in areas having widely varying signal propagation properties. The data communication system of the present invention provides a way of decreasing the mutual interference between elements in the system without requiring a large number of small cells.

SUMMARY OF THE INVENTION

The present invention is a novel and improved method and apparatus for high rate packet data transmission in a CDMA system. The present invention improves the efficiency of a CDMA system by providing a means of providing a strong forward link signal to a destination subscriber station while causing minimal interference to other subscriber stations.

The present invention provides an alternate approach to maximizing capacity in a high-data-rate wireless system by adapting beamforming techniques for use in terrestrial wireless applications. In accordance with the present invention, a cellular system with multiple transmit antennas at each base station is described. From each base station, the same signal, but with each having different relative phase shifts and power levels, is transmitted from each antenna. In order to maximize the carrier-to-interference ratio (C/I) of the intended receiver of the signal (usually a single subscriber station) the phases of the signals being transmitted from each of the transmit antennas must be set appropriately.

One method of maximizing C/I at the subscriber station is by determining the channel impulse response from each of the serving base station's transmit antennas to the subscriber station. The serving base station requires knowledge of the phase and gain of each signal received at the subscriber station antenna from each transmit antenna of the serving base station. Therefore, a scheme must be devised to allow the subscriber station to estimate phase and gain of the signal received from each of the transmit antennas. One method is to send a reference signal having characteristics known by both the transmitter and the receiver on each of the transmit antennas. In an exemplary embodiment of the present invention, a reference signal burst is sent from each antenna of the base station, allowing the subscriber station to estimate the channel impulse response corresponding to each of the transmit antennas separately. The reference signal bursts may be separated either by transmitting the bursts through one antenna at a time, or by using a different code space for each antenna, such as a different Walsh code for each antenna.

The base station may alternatively send channel impulse response reference signals continuously on each transmit antenna, but using a reference signal having a different structure for each antenna. The subscriber stations may detect the different references separately and estimate the channel impulse response corresponding to each transmit antenna. When there are multiple receive antennas at the subscriber station, then the subscriber station must estimate the channel impulse response corresponding to each transmit antenna-receive antenna pair.

The subscriber station transmits a signal indicative of the estimated channel impulse responses corresponding to each transmit antenna-receive antenna pair to the base station on the reverse link. Once the channel impulse response of each transmit antenna-receive antenna pair is known, the base station may then optimally form a beam toward each subscriber station.

An alternative method of adjusting the signals sent from the transmit antennas is based on sending signal quality feedback other than channel impulse response from the subscriber station to the base station. For example, the subscriber station may measure the C/I it receives and send to the base station a signal indicative of the estimated received C/I value. The base station may then adjust the phase of the signal transmitted on one or all of its transmit antennas. The subscriber station then makes a new estimate of the received C/I and sends that estimate to the base station. The base station compares the new C/I with the old C/I. If the C/I increased, the base station further adjusts the phases of the transmit signals in the same direction as before in order to further increase the C/I at the subscriber station. If, however, the new C/I is lower than the old C/I, the base station adjusts the transmit phases in the opposite direction. Different algorithms may be used to update the transmit signal phase and gains on the different antennas based on signal quality feedback from the subscriber stations.

Any signal quality metric that is based on the estimated C/I may be used by the subscriber station as feedback to the base station. In the exemplary high-data-rate wireless communication system described in the '386 application, the subscriber station determines a data rate at which it can successfully receive packets based on its estimated C/I. The data rate, instead of the C/I measurement, is sent to the base station in the form of a data rate control (DRC) signal. In the exemplary system, DRC information is embedded in the reverse link signal sent by the subscriber station. The base station may then use the changes in the DRC signal to determine whether it is changing the phase of the transmit signal in the right direction. Once the phases corresponding to the maximum data rate control (maximum DRC) signal from a subscriber station are found, the base station uses those phases for all transmissions to that particular subscriber station. Usually, the base station must schedule packets to be transmitted to multiple subscriber stations. In this situation, a scheduling algorithm is devised which determines the order in which packets are transmitted on the forward link to different subscriber stations. Once the scheduler decides which subscriber station to serve, the base station uses the phases corresponding to the maximum DRC to transmit signals to that subscriber station.

In the exemplary system described in the '386 application, the C/I and DRC information measured at a subscriber station is based on comparing a signal from the serving base station to interference from all other base stations. The interference caused by other base stations at any one time depends on the phases of the signals transmitted by those base stations. Suppose that during the time slot within which the subscriber station is scheduled to receive data from a first base station, a second base station changes its transmit phases. This may increase the interference level at the subscriber station under consideration, reducing the reliability of receiving the signal transmitted by the first base station to an unacceptable level, resulting in an increase of the packet error rate at the subscriber station.

One way to solve the preceding problem is for each base station to allocate an additional signal burst (referred to herein as a DRC reference burst), which is sent using the transmit phases that the base station intends to use a predetermined number of slots in the future. The subscriber stations may then compute appropriate future forward link data rates using the DRC reference burst. This way the subscriber stations will estimate future DRC's knowing what the interference levels will be. Therefore, during each time slot two types of signal bursts will be sent, data pilot bursts for demodulating the data in the current slot and DRC reference bursts for estimating the DRC of two slots from now. Note that the data pilot is being sent using the same transmit phases as are used to send the data in the current slot.

In the proposed Third Generation CDMA systems, the signals are modulated using a quaternary phase shift keyed (QPSK) modulation. In order to balance the load on the in-phase (I) and quadrature phase (Q) components of the QPSK signals, a method of complex PN spreading is employed. Complex PN spreading is described in U.S. patent application Ser. No. 08/856,428, entitled "REDUCED PEAK-TO-AVERAGE TRANSMIT POWER HIGH DATA RATE IN A CDMA WIRELESS COMMUNICATION SYSTEM," assigned to the assignee of the present invention and incorporated by reference herein.

A method and apparatus for demodulating signals from different base stations in soft handoff and for improved signal estimation based on multipath reception is described in detail in U.S. Pat. No. 5,109,390, entitled "DIVERSITY RECEIVER IN A CDMA CELLULAR TELECOMMUNICATION SYSTEM," assigned to the assignee of the present invention and incorporated by reference herein.

A method and apparatus for performing search and acquisition in a CDMA communication system is disclosed in detail in U.S. Pat. Nos. 5,644,591 and 5,805,648 entitled "METHOD AND APPARATUS FOR PERFORMING SEARCH ACQUISITION IN A CDMA COMMUNICATIONS SYSTEM," both assigned to the assignee of the present invention and incorporated by reference herein.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
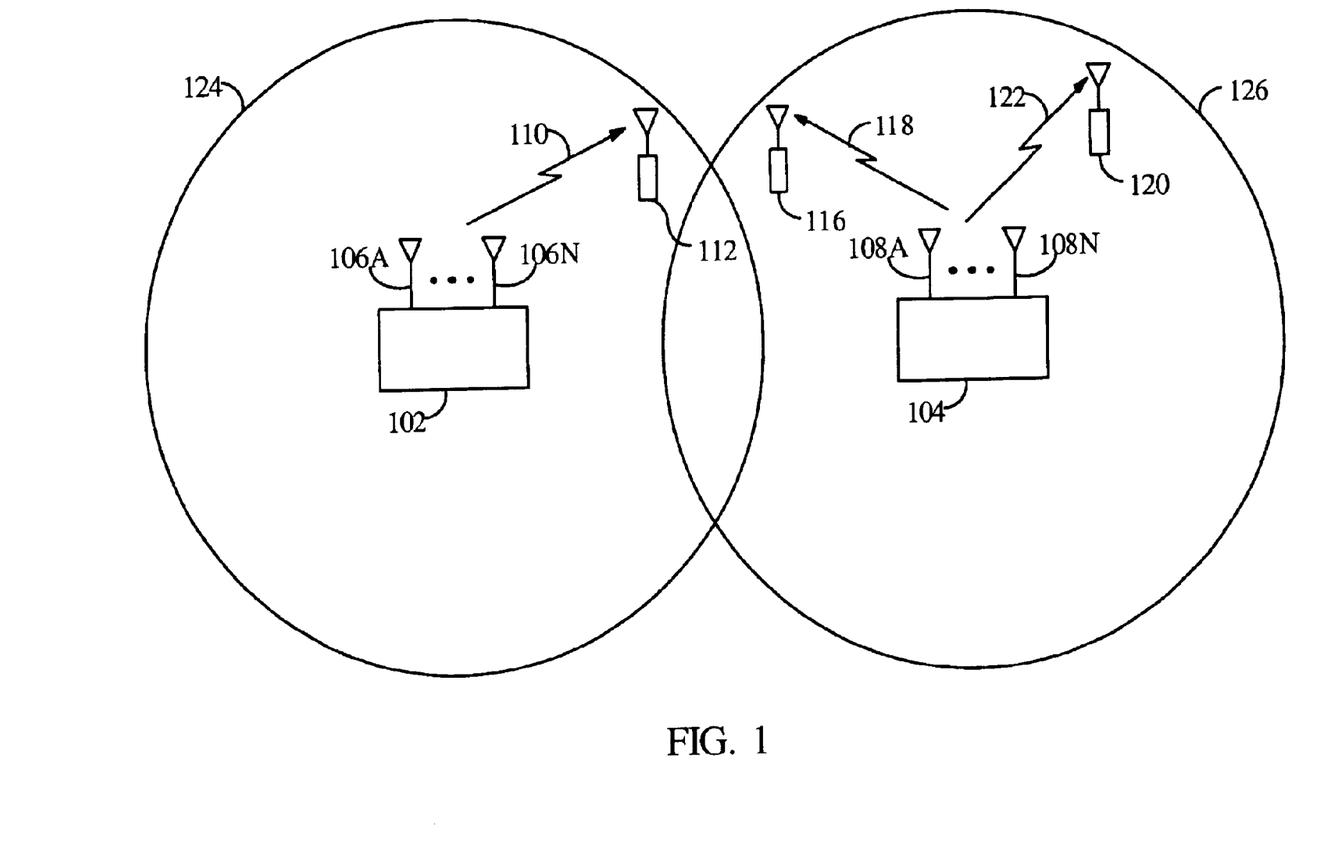
FIG. 1 is a diagram of terrestrial base stations and subscriber stations configured in accordance with an embodiment of the invention.

FIG. 1 shows terrestrial base station 102 transmitting to subscriber station 112 within cell area 124 and terrestrial base station 104 transmitting to subscriber station 116 within cell area 126. Base station 102 transmits through a plurality of transmit antennas 106, and base station 104 transmits through a plurality of transmit antennas 108. Though each base station is shown with only two transmit antennas, the present invention is applicable to a base station having two or more transmit antennas, including one which utilizes a directional antenna array. In addition, one skilled in the art will appreciate that antennas having a variety of types and polarization may be used without departing from the present invention, including omni-directional and 120-degree directional antennas. In addition, one antenna used for transmission from a base station may be of a different type than other antennas used by the same base station without departing from the present invention.

The signals transmitted through the plurality of antennas of a single base station are identical, except for differences in transmit phase. When transmitting a signal to subscriber station 112, base station 102 adjusts the phase of the signals transmitted through the antennas 106 to form a signal beam 110 directed at the one or more receive antennas belonging to subscriber station 112. For example, a signal transmitted through antenna 106a may be transmitted slightly before the same signal transmitted through antenna 106n in order that the two signals arrive in-phase at subscriber station 112. Likewise, base station 104 adjusts the phase of the signals transmitted through its antennas 108 to form a signal beam 118 toward subscriber station 116, or to form a signal beam 122 toward subscriber station 120.

In general, a base station using beamforming to transmit to subscriber stations scattered randomly through its coverage causes less interference to subscriber stations in neighboring cells than a base station transmitting through a single antenna to all its subscriber stations. Depending on the location of a subscriber station 112 in its cell, a beam 110 from a first base station 102 may cause minimal interference to a subscriber station 116 receiving a signal from a second base station 104. At other times, the beam 110 from the first base station 102 will be in such a direction as to cause greater interference to the subscriber station 116. In order to maximize the efficient use of transmit spectrum, base station 104 adjusts the signal sent to the subscriber station 116 based on the interference caused by the beam 110 transmitted by base station 102.

At times, a base station must send broadcast information to all the subscriber stations in its cell coverage area. Since it is unlikely that all the subscriber stations in the cell lie along an identical beam, such broadcast information is transmitted using a broad beam intended to reach all subscriber stations in the base station's coverage area.

Carrier-to-Interference Ratio (C/I) Estimation and Data Rate Control (DRC)

In the preferred embodiment, transmissions are CDMA signals, wherein the transmissions of base stations serving other subscriber stations and cell areas often cause the majority of the interference experienced by a receiving subscriber station. In the preferred embodiment, each subscriber station performs periodic estimates of C/I, or carrier-to-interference ratio. The resulting C/I measurement information is then transmitted from each subscriber station to its serving base station. The base station transmits at a fixed power level, but varies the data rate used to transmit to each subscriber station according to the C/I information received from that subscriber station.

There exists an inherent delay between the time that the subscriber station measures C/I, transmits the results to its serving base station, and the time that the base station transmits data to the subscriber station using those C/I measurements. If the interference present during data transmission exceeds the interference present during the C/I measurements, the base station sends data to the measuring subscriber station at too high of a data rate for reliable reception. The result is lost data to the subscriber station. If the interference present during data transmission is less than that during C/I measurements, the base station will send data to the measuring subscriber station at a lower data rate than can actually be supported by the channel. While this does not cause data loss at the subscriber station, using sub-optimal data rates is undesirable, because it reduces the overall capacity of the system.

In the exemplary embodiment, each base station transmits to the subscriber stations located within its cell coverage area, transmitting high-speed data bursts to one subscriber station at a time during time slots of a predetermined duration. If a base station has data queued up for several subscriber stations at a particular time, the base station exercises a prioritized first-in-first-out approach in choosing the order in which data is sent to the subscriber stations. In the exemplary embodiment, each base station schedules time slots for each of its subscriber stations without regard for the effect of the resultant beam on subscriber stations in neighboring cells.

In an alternative embodiment, base stations coordinate the scheduling of transmit beams to minimize interference to subscriber stations in neighboring cells and to maximize throughput to each subscriber station in the network.

In a CDMA system using base station transmit beamforming, each base station directs a signal beam to each subscriber station to which it sends a data burst. As the base station transmits to the various subscriber stations in its coverage area, the direction of its transmission beam changes according to the location of each receiving subscriber station. As depicted in FIG. 1, a beam 118 from base station 104 toward a subscriber station 116 may lie in a direction so as to cause great interference to a signal received by a subscriber station 112 in another cell 124. At other times, base station 104 may transmit to a different subscriber station 120 along a path 122 causing minimal interference to signals received at subscriber station 112. Of course, the direction of beam 118 or 122 used by base station 104 is most important to subscriber station 112 when base station 102 must choose a data rate for transmission to it.

As discussed above, subscriber station 112 performs measurements of C/I in order to send base station 102 information used to choose a data rate for transmissions from base station 102 to subscriber station 112. If the amount of interference to subscriber station 112 caused by base stations other than the serving base station 102 is great, then base station 102 transmits to subscriber station 112 at a low data rate. Conversely, if the interference to subscriber station 112 from base stations other than the serving base station 102 is small, then base station 102 transmits to subscriber station 112 at a high data rate.

Unfortunately, since the direction of the beams used by other base stations can vary based on the location of subscriber stations in their respective cell coverage areas, the C/I measured by a subscriber station may also vary widely. An estimate of C/I is only useful for selecting an appropriate data rate for a time slot if it corresponds to the interference present during the time slot of transmission. An inability to predict the C/I for a given subscriber station and time slot makes an accurate selection of an optimal data rate impossible.

The problems of C/I prediction are addressed in an embodiment of the present invention wherein each base station in the wireless network transmits a data rate control (DRC) reference signal along the beam to be used in a future transmission. This DRC reference signal is used by each subscriber station to estimate and predict the interference level that will exist when the subscriber station receives a future transmission.

Figure 2:
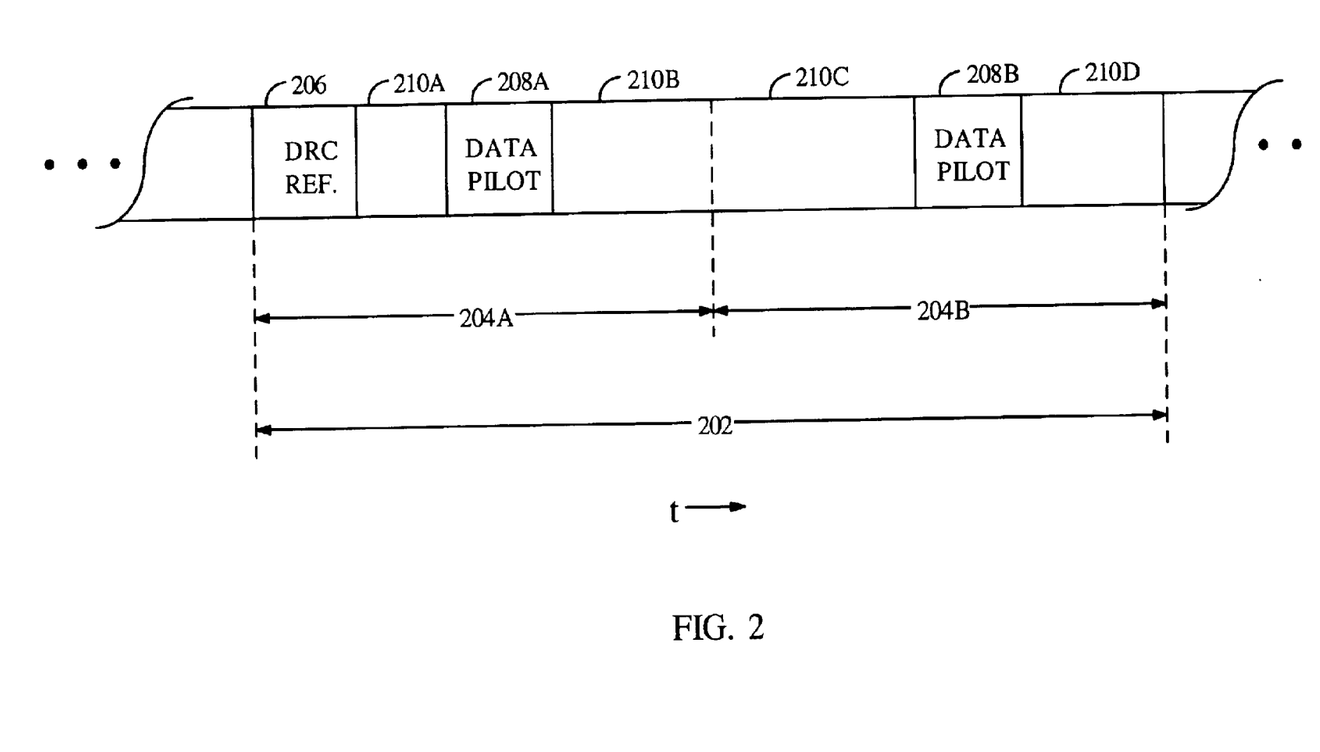
FIG. 2 is a diagram of the structure of frames transmitted over the air in accordance with an embodiment of the invention.

FIG. 2 shows the signal structure of a transmission time slot in accordance with the preferred embodiment of the invention. The base station transmits data in time slots of a predetermined period 202. Each time slot is divided into two equal half-slots 204a and 204b. In the preferred embodiment of the invention, each time slot is 2048 symbol chips in length, and each half-slot is 1024 chips in length. At the center of each half-slot 204 is a data pilot burst 208. In the preferred embodiment of the invention, each data pilot burst 208 is 96 chips in duration. Some time before the data pilot 208a of the first half-slot 204a, the base station transmits a data rate control (DRC) reference burst 206. In the preferred embodiment, DRC reference burst 206 is also 96 chips in length. The remaining portions 210 of each slot 202 contain the subscriber station data of the slot, along with other necessary signal components such as power control information. The subscriber station data is demodulated using data pilot bursts 208 transmitted on the same beam as the subscriber station data. One skilled in the art will appreciate that the chip lengths described, such as the slot length, half-slot length, data pilot burst length, and DRC reference burst length, may be varied without departing from the present invention.

The DRC reference burst 206 is generally not transmitted along the same beam as the data pilots 208 or the subscriber station data, but rather is transmitted along a potentially different beam which will be used a predetermined time offset in the future. In the preferred embodiment of the invention, this predetermined time offset is two slots. Therefore, if slot 202 depicted is slot n, then the DRC reference burst 206 is transmitted along the beam which will be used to transmit the data pilot bursts and subscriber station data sections of slot n+2. One skilled in the art will appreciate that the predetermined time offset may be of a length other than two slots without departing from the present invention.

If data is to be directed from base station 102 to subscriber station 112 during slot n+2, then base station 102 will transmit its DRC reference burst along a beam 110 associated with subscriber station 112 during slot n,. During the same slot n, a neighboring base station 104 transmits a DRC reference burst along a beam associated with the subscriber station it will transmit to in slot n+2. As an example, suppose subscriber station 116 is the destination of data from base station 104 along beam 118 during slot n+2. Subscriber station 112 then receives the DRC reference burst signals from both base stations 102 and 104, and generates a C/I measurement based on the received signals. In the preferred embodiment of the invention, the transmissions of each base station are mixed with a pseudonoise (PN) sequence having PN offsets that allow subscriber stations to distinguish each base station from one another. Subscriber station 112 maintains acquisition of the pilot and reference signals transmitted by its serving base station 102. During slot n, subscriber station 112 generates a C/I measurement which compares the strength of the DRC reference burst transmitted along beam 110 to the interference caused by DRC reference bursts from the surrounding base stations, such as the DRC reference burst from base station 104.

DRC reference burst 206 must be transmitted early in each slot 202, so that there is enough time for the subscriber station to generate interference estimates from the DRC reference signals, transmit the interference information to the base station, and for the base station to use the information to transmit data to the subscriber station at the appropriate rate. For this reason, the exemplary embodiment is shown with the DRC reference burst 206 is shown as being transmitted at the beginning of the slot period 202. One skilled in the art will appreciate that the position of the DRC reference burst 206 within the slot 202 may vary without departing from the present invention.

Beamforming Optimization

In order to use beamforming techniques to direct signal beams at particular subscriber stations, the optimal beam for each subscriber station must be known by the transmitting base stations. In a terrestrial wireless network, it is desirable to be able to add or move subscriber stations without performing some kind of beamforming calibration of the base stations in the network or each added or moved subscriber station. Even if calibration were permissible for each subscriber station added or moved, the propagation environment in terrestrial wireless environments can change over time, independently of addition or movement. There is a need to be able to adaptively optimize the beams used to transmit signals to each subscriber station over time.

Several methods of beamforming optimization are illustrated by embodiments of the present invention. None require beamforming calibration, and all may be used to adaptively adjust transmit beams in a wireless network wherein base stations transmit along beams to subscriber stations.

A first embodiment of the invention uses gated signals to characterize the transmission channel from the base station to each subscriber station. Base stations transmit a reference signal having characteristics known by subscriber stations through each of a plurality of transmit antennas, and the subscriber station uses the received signals to estimate the channel impulse response of the channel. By evaluating a predetermined reference signal transmitted through only one transmit antenna at a time, the subscriber station can provide base stations with channel impulse response information for each individual transmit antenna.

In an alternative embodiment, instead of separating reference signals for each antenna in time, the reference signals for each of the plurality of transmit antennas are transmitted simultaneously, but separated by orthogonal coding, for example using a different Walsh code for each antenna.

In the preferred embodiment of the invention, the predetermined reference signal is a CDMA pseudonoise (PN) signal, and the subscriber station utilizes a CDMA searcher to estimate the relative offsets of the pilot signals received from each transmit antenna. Once the relative offsets are communicated back to a base station, that base station can use the information to adjust the phase of the signals transmitted through each antenna such that they arrive in-phase at the subscriber station's receiver. The result of such phase adjustments of transmit signals through multiple antennas will be a beam in the direction of the associated subscriber station.

In an alternative embodiment, the reference signals corresponding to the different transmit antennas of each base station are transmitted continuously, but differ in structure such that the subscriber station can distinguish them from each other. The techniques that can be employed to vary the structure of the different reference signals include varying their PN offsets or mixing each with a different orthogonal Walsh code. A method for transmitting multiple pilot signals in a code space efficient manner is described in U.S. patent application Ser. No. 08/925,521, entitled "METHOD AND APPARATUS FOR PROVIDING ORTHOGONAL SPOT BEAMS, SECTORS AND PICOCELLS," now U.S. Pat. No. 6,285,655, issued on Sep. 4, 2001 to Lundby et al., assigned to the assignee of the present invention and incorporated by reference herein.

In an alternative embodiment, each subscriber station also measures the amplitude of the signals received from each transmit antenna. In some cases, obstructions may cause blockage of signals from one transmit antenna of a base station to a subscriber station, but not others. When the amplitude measurements are communicated by the subscriber station to the base station, the base station uses the information to decide which transmit antennas to use when transmitting data to the measuring subscriber station. Rather than transmit a signal from a blocked antenna, which will not benefit the destination subscriber station and will cause added interference to neighboring cells, only the unblocked transmit antennas are used to transmit signals to the destination subscriber station.

The advantages of performing such channel impulse response measurements include accuracy and quick establishment of optimal transmit beams to each subscriber station. As the number of transmit antennas used by a base station increases. However, the overhead required to measure the channel impulse response characteristics for each antenna and maintain them at the serving base station becomes burdensome.

The preferred embodiment of the present invention accomplishes beamforming optimization using C/I measurement information sent from each subscriber station to each of its serving base stations. Each serving base station iteratively adjusts the beam used to transmit to each subscriber station and evaluates the impact of the beam adjustment on the C/I information sent back from that subscriber station. This method is simpler and requires less overhead than measuring the channel impulse response for each individual transmit antenna. Being iterative, however, beamforming optimization using this method may take more time than the channel impulse response method.

In the preferred embodiment, the C/I measurements generated by a subscriber station are used to select data rates to be used with subsequent transmissions to the subscriber station by a base station. The resulting data rate information is transmitted from each subscriber station to a serving base station through a data rate control (DRC) channel. In the preferred embodiment, the data rate information sent to each base station over the DRC channel is also used for beamforming optimization. Though the C/I measurements are necessarily quantized in forming DRC information, the DRC information requires less bandwidth. Reusing the DRC channel to perform beamforming optimization also facilitates continual optimization which can compensate for changes in the propagation environment or movement of subscriber stations over time.

Beamforming Base Station Transmitter Apparatus

Figure 3:
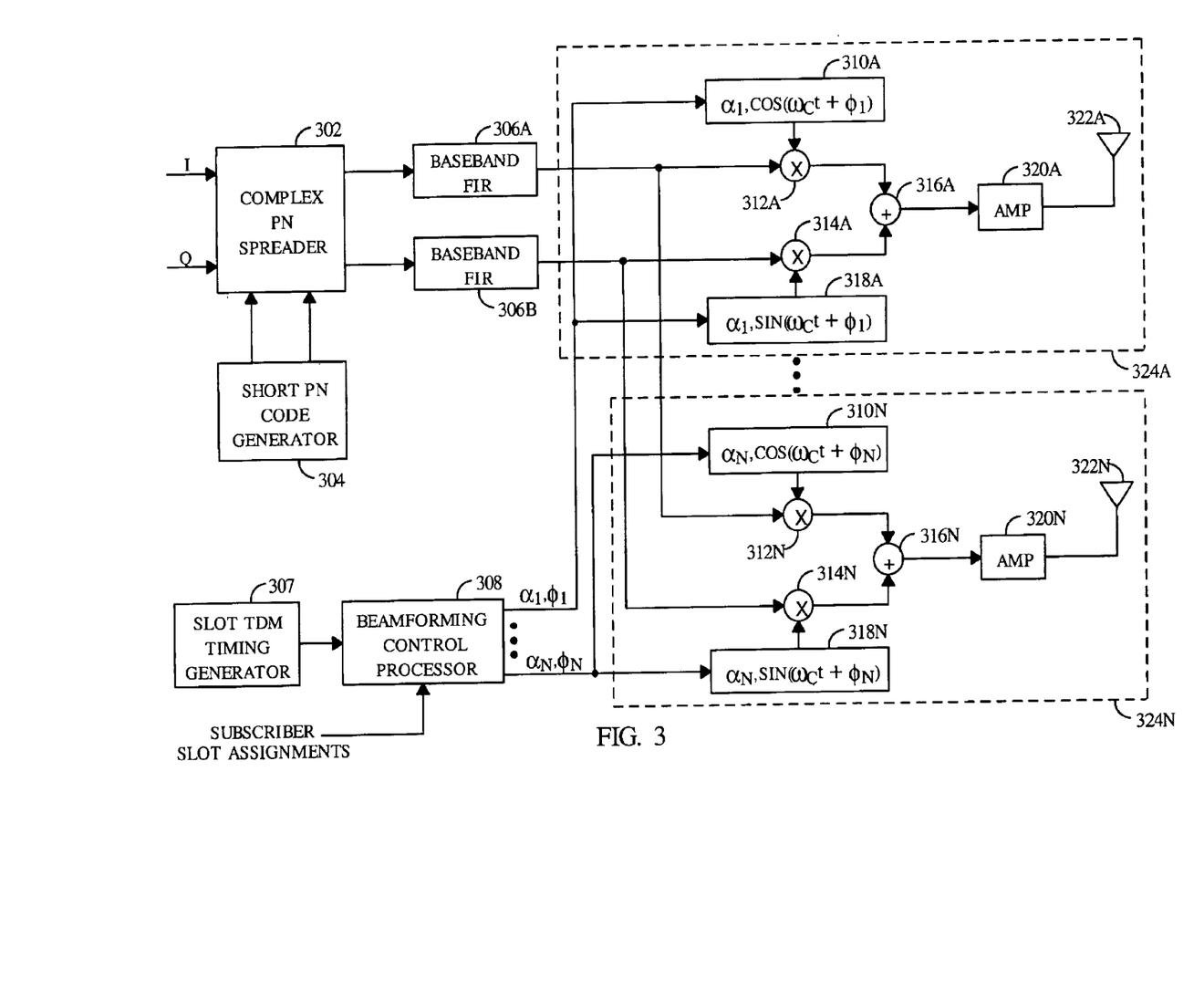
FIG. 3 is a block diagram of a base station apparatus configured in accordance with an embodiment of the invention.

FIG. 3 shows a block diagram of an exemplary embodiment of a CDMA base station used to transmit signals to one or more subscriber stations in a cell through multiple transmit antennas in accordance with a preferred embodiment of the present invention. The data to be transmitted is generated in the form of streams of in-band (I) and quadrature (Q) samples that are provided as input to a complex pseudonoise (PN) spreader 302. Complex PN spreader 302 mixes the I and Q samples with short PN code samples generated by short PN code generator 304. The resulting PN spread sample streams are filtered by baseband finite impulse-response (FIR) filters 306a and 306b to generate the baseband complex sample streams to be upconverted and transmitted to subscriber stations. In accordance with complex PN spreading techniques as described in aforementioned U.S. patent application Ser. No. 08/856,428, the signals provided to baseband FIR's 306a and 306b are according to the following equations:

$$X_I = I*PN_I - Q*PN_Q \quad (1)$$

$$X_Q = Q*PN_I + I*PN_Q \quad (2)$$

where I are the digital in-phase samples, Q are digital quadrature-phase samples, $PN_I$ is the in-phase short PN sequence, $PN_Q$ is the quadrature phase PN sequence and $X_I$ and $X_Q$ are the signals to be modulated onto the in-phase and quadrature-phase channels respectively. The signal represented by equation (1) is filtered by FIR filter 306a, and the signal represented by equation (2) is filtered by FIR filter 306b. FIR filters 306a and 306b act to shape the transmit waveform to fit into the allocated bandwidth and minimize intersymbol interference.

Signals output by FIR filters 306a and 306b are provided to the two or more antenna transmission subsystems 324, each antenna transmission subsystem comprising a single transmit antenna 322. Slot TDM timing generator 307 generates timing signals corresponding to the various time-division-multiplex (TDM) transmit periods within each transmit slot 202. Slot TDM timing generator 307 provides this output signal to beamforming control processor 308, which uses the signal to transmit signals corresponding to the different TDM periods on different signal beams. As described above, the beam used to transmit the DRC reference portion of the signal 206 may be different than the beam used to transmit the data pilot 208 and subscriber station data 210 portions of each slot 202.

Based on the signal from slot TDM timing generator 307, beamforming control processor 308 provides separate phase and amplitude control signals to each antenna transmission subsystem 324. By adjusting the phase control signals to each antenna transmission subsystem 324, beamforming control processor 308 varies the base station's transmit beam over time along beams corresponding to different subscriber stations in its cell. As shown, beamforming control processor 308 provides amplitude control signal $\alpha_I$ and phase control signal $\phi_I$ to antenna transmission subsystem 324a, and provides amplitude control signal $\alpha_n$ and phase control signal $\phi_n$ to antenna transmission subsystem 324n. Also as discussed above, the beamforming phase and amplitude signals generated by beamforming control processor 308 are based on C/I information received by the base station from each subscriber station in its cell.

In an exemplary embodiment, beamforming control processor 308 maintains a database of the beamforming parameters optimal for each subscriber station in the base station's coverage area. As shown, beamforming control processor 308 receives a signal indicating the assignment of slots to subscriber stations or beams from a base station control processor (not shown).

Beamforming control processor 308 may be implemented using microprocessors, field-programmable gate arrays (FPGA), programmable logic devices (PLD), digital signal processors (DSP), application specific integrated circuit (ASIC) or other device capable of generating and adjusting the necessary amplitude and phase control signals. One skilled in the art will appreciate that this does not preclude implementing beamforming control processor 308 function inside another processor already present in the transmitter apparatus.

As described above, if the signal propagation path from antenna 322n to the destination subscriber station was earlier determined to be blocked, control processor 308 sends an amplitude control signal $\alpha_n$ to antenna transmission subsystem 324n indicating a transmission at very low, or even zero power.

Each antenna transmission subsystem 324 includes the components necessary upconversion, phase control, amplification, and transmission of the signal through one transmit antenna 322. The signals provided by baseband FIR 306a are mixed in mixer 312 with a mixing signal provided by phase-controlled oscillator 310. The signals provided by baseband FIR 306b are mixed in mixer 314 with a mixing signal provided by phase-controlled oscillator 318. As indicated, phase-controlled oscillators 310 and 318 receive amplitude and phase control signals from beamforming control processor 308, which are used to vary the phase and amplitude of their output mixing signals. The output signals of mixers 312 and 314 are added together in summer 316 and provided to amplifier 320 for transmission through transmit antenna 322.

Not shown for each antenna transmission subsystem 324 are digital-to-analog converters (DAC's) required to convert the digital signals to analog format prior to amplification and transmission. One skilled in the art will appreciate that there are multiple places in which conversion to analog format may be done without departing from the present invention.

In the preferred embodiment of the invention, each antenna transmission subsystem 324 includes a DAC placed between summer 316 and amplifier 320. In this preferred embodiment, mixers 312 and 314 are digital mixers, and phase-controlled oscillators 310 and 318 generate digital oscillator signals. Each DAC serves to convert the digital output of summer 316 to an analog signal which is then amplified and transmitted by amplifier 320.

In an alternative embodiment, the input signal provided to antenna transmission subsystems 324 is already in analog format (converted to analog prior to providing the signal to antenna transmission subsystem 324). In this alternative embodiment, phase-controlled oscillators 310 and 318 generate analog mixing signals, mixers 312 and 314 are analog mixers, and summers 316 are analog summers.

One skilled in the art will also appreciate that amplitude control of the signals transmitted through each antenna can be implemented in different ways without departing from the present invention. In an exemplary embodiment, beamforming control processor 308 provides amplitude control signals to each individual amplifier 320 of each antenna transmission subsystem 324.

One skilled in the art will recognize that the phase-controlled oscillators 310 and 318 may be implemented in a variety of ways without departing from the present invention. In an exemplary embodiment, a phase-controlled direct digital synthesizer (DDS) may be used to generate a digital sinusoidal signal with very fine phase resolution. In another embodiment, oscillators 310 and 318 are not phase-controlled, but a phase shifter is placed between summer 316 and amplifier 320.

Though two antenna transmission subsystems 324 are shown in FIG. 3, more than two antenna transmission subsystems may be implemented in a beamforming base station without departing from the present invention.

Subscriber Station Apparatus

Figure 4:
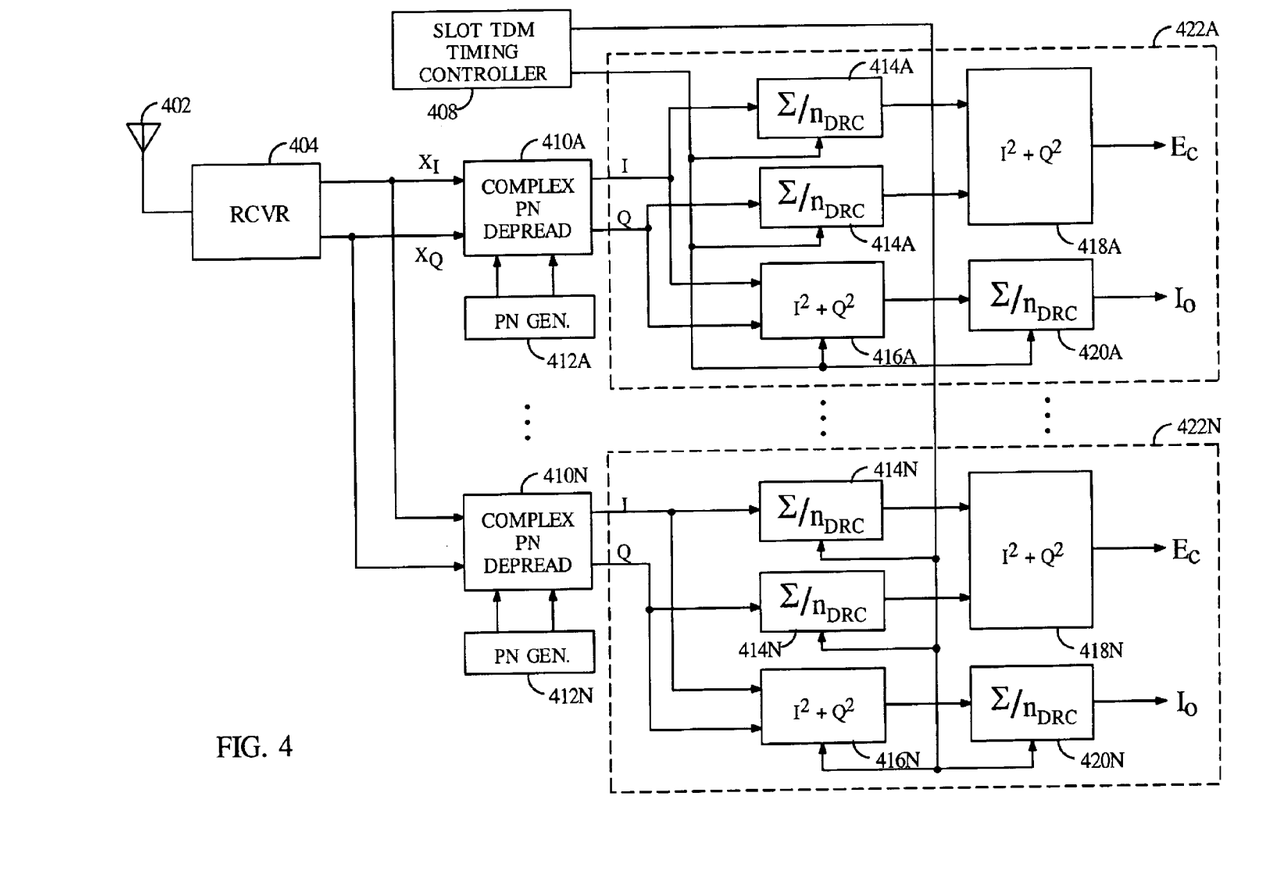
FIG. 4 is a diagram of a portion of a CDMA subscriber station apparatus configured in accordance with a preferred embodiment of the invention.

FIG. 4 is a diagram of a portion of a CDMA subscriber station apparatus configured in accordance with a preferred embodiment of the present invention. The apparatus shown is used to estimate the carrier-to-interference ration (C/I) of each of several possible signal propagation paths or "fingers."

The CDMA subscriber station receives a wireless signal through antenna 402. This received signal includes signal components from the subscriber station's serving base stations, from base stations of neighboring cells, and thermal noise.

The signals received at antenna 402 are provided to receiver 404, which performs several functions well known in the art including automatic gain control (AGC), downconversion, and complex sampling to produce digital $X_I$ and $X_Q$ sample streams discussed above with equations (1) and (2). The sample streams are provided to the one or more finger demodulator modules of the receiver. FIG. 4 shows the components of a subset of each finger demodulator module called a C/I estimation module 422. Each C/I estimation module 422 generates C/I estimates corresponding to the signal received over a single propagation path from a single base station.

In the preferred embodiment, each finger demodulator includes a complex PN despreader 410, which receives the $X_I$ and $X_Q$ sample streams and uses pseudonoise sequences $PN_I$ and $PN_Q$ from a PN generator 412 to produce PN despread I and Q sample streams. The time offset of the PN signal generated by each PN generator 412 is controlled by a finger assignment controller (not shown). Slot TDM timing controller 408 provides a DRC reference timing signal to the C/I estimation module 422 of each finger demodulator corresponding to DRC reference period 206 of each frame period 202. The DRC reference timing signal from slot TDM timing controller 408 is aligned with signals generated by the corresponding PN generator 412 of each finger demodulator.

Within each C/I estimation module 422, separate averages of I and Q samples are generated by accumulators 414 before being squared and summed in module 418. Using the signal provided by slot TDM timing controller 408, accumulator 414 accumulates samples over the DRC reference period 206, at the end of which the accumulated total is divided by $n_{DRC}$, which is the sample duration of the DRC reference period 206. For example, if the I and Q signals produced by complex PN despreader 410 are each produced at the rate of one sample per chip, and the DRC reference period 206 is 96 chips, then the sum accumulated in each accumulator 414 over each DRC reference period 206 is divided by 96 at the end of each DRC reference period. The results of this division calculation output by each accumulator 414 is the average I or Q sample value during the DRC reference period 206. These two averages are squared and added in module 418 to produce the average carrier energy value $E_C$ used in subsequent C/I calculations.

Within each C/I estimation module 422, the I and Q sample streams from each complex PN despreader 410 are also squared and summed on a sample-by-sample basis in module 416. The resulting stream of sum-of-square values is accumulated in accumulator 420, which performs the same function as accumulators 414. Using the signal provided by slot TDM timing controller 408, accumulator 420 accumulates samples over the DRC reference period 206, at the end of which the accumulated total is divided by the sample duration of the DRC reference period 206. The average produced by accumulator 420 is an average signal level $I_0$ used in subsequent C/I calculations.

One skilled in the art will appreciate that accumulators 414 and 420 may be implemented in a variety of ways including as summers, integrators, buffers, or low-pass filters without departing from the present invention.

Once the $E_C$ and $I_0$ values are produced for each finger demodulator, the C/I for that finger is calculated according to the following equation:

$$\frac{C}{I} = \frac{E_C}{I_0 - E_C} \qquad (3)$$

where C/I is carrier-to-interference ratio. In the preferred embodiment, the C/I values for all finger demodulators in the subscriber station are summed to generate an overall C/I value according to equation (4):

$$\left(\frac{C}{I}\right)_{overall} = \sum_{i=1}^{\#de\,mod's} \left(\frac{C}{I}\right)_i \qquad (4)$$

where $(C/I)_{overall}$ is the C/I value used by the subscriber station to generate the DRC signal to the base station, $(C/I)_I$ is the C/I value measured by each finger demodulator and #demod's is the number of finger demodulators in use by the receiver. The overall C/I value is then mapped into a predetermined set of data rates, which are transmitted over-the-air to the subscriber station's one or more serving base stations.

Although depicted with only two finger demodulators, one skilled in the art will recognize that a receiver may have more than two finger demodulators, and hence more than two C/I estimation modules 422, without departing from the present invention. Also, a receiver may use a despreading method other than complex PN despreading, such as orthogonal coding or simple PN despreading, without departing from the present invention.

Beamforming Optimization Method

Figure 5:
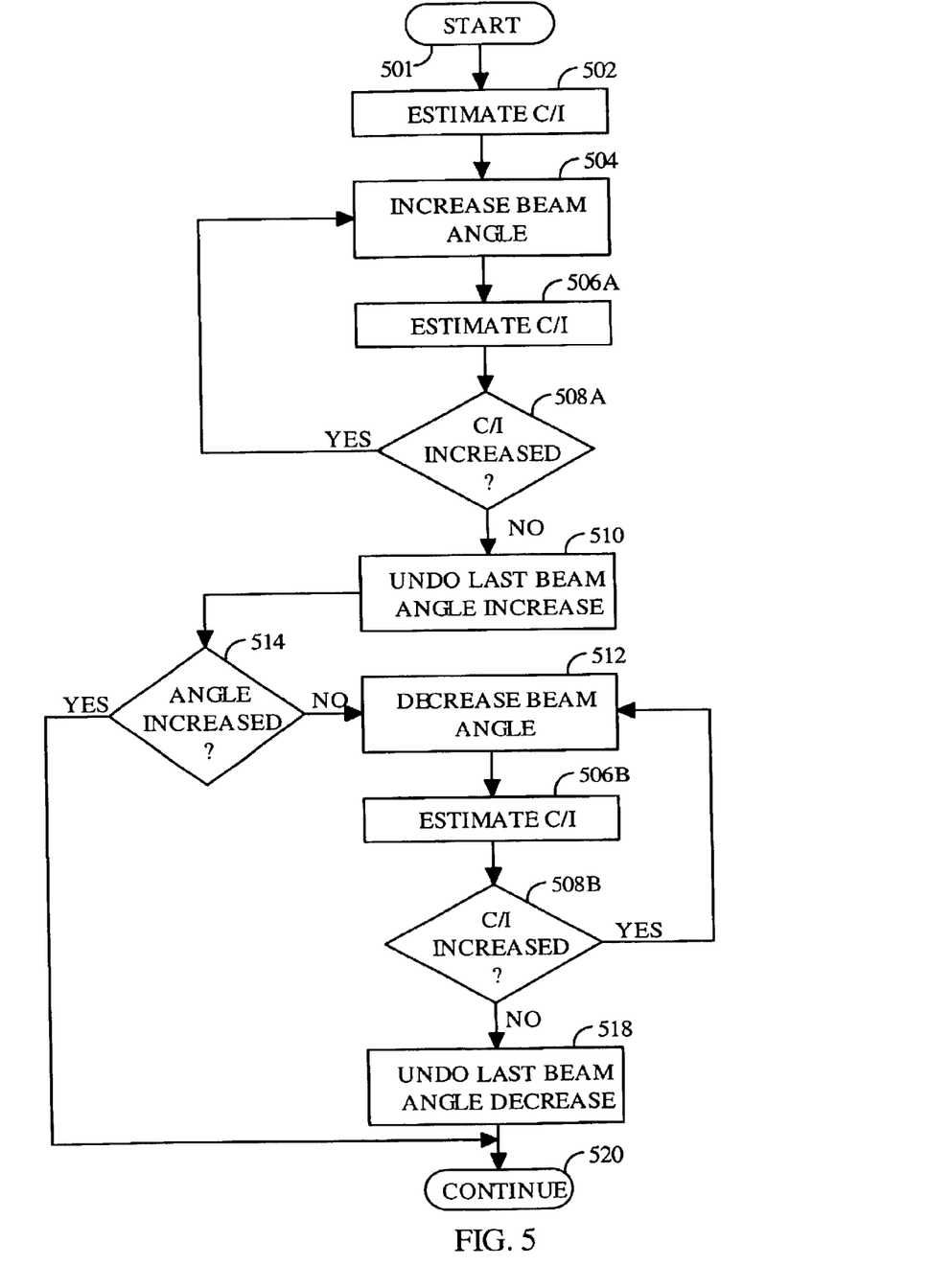
FIG. 5 is a flowchart depicting a process for optimizing the transmit beam used by a base station in transmitting to a subscriber station in accordance with an embodiment of the invention.

FIG. 5 is a flowchart depicting a process for optimizing the transmit beam used by a base station in transmitting to a subscriber station in accordance with an embodiment of the present invention. In the exemplary embodiment, the optimization process encompassed by the steps between start block 501 and continue block 520 is completed for each subscriber station in a base station's coverage area.

The first step in optimizing the transmit beam for a single subscriber station is measuring the C/I at the subscriber station and providing that measurement information to the serving base station 502. The C/I value is calculated according to equations (3) and (4) above. After this C/I level is obtained as a baseline, the transmit beam angle of the serving base station is offset by a predetermined positive beam angle increment 504. Let us say for this example that increasing the beam angle is moving the beam in a clockwise direction around the base station. (It will be easily recognized that the designation of one direction as being "increasing" the angle is arbitrary.)

At C/I estimation step 506a, the subscriber station again measures the C/I of its received signal and provides the information to the serving base station. The base station then evaluates the change in C/I resulting from the increase in beam angle at step 508a. If the C/I increases, steps 504, 506a, and 508a are repeated, and are repeated until increasing the beam angle of the signal no longer results in a measurable increase in C/I, or results in a decrease in C/I. When one of these beam angle adjustments 504 results in a decrease in C/I, that most recent beam angle adjustment is undone (reversed) 510. Step 510 restores the transmit beam angle to its state prior to the most recent beam angle adjustment.

At step 514, the effects of increasing transmit beam angle are evaluated to see if decreasing the transmit beam angle might result in an improved C/I. If steps 504 through 510 resulted in a lasting beam angle increase, the steps of trying out a decrease in beam angle (steps 512 to 518) are skipped. In other words, if more than one beam angle increase has been made, or if steps 504, 506, and 508 resulted in a beam angle increase which is not undone by step 510, then it is not necessary to evaluate whether decreasing the transmit beam angle will improve C/I. In this case, the present method proceeds from step 514 to step 520.

If, however, it is still questionable whether a beam angle decrease would improve C/I, then the transmit beam angle is offset by a predetermined negative beam angle offset 504, and the resulting C/I is estimated at the subscriber station and provided to the serving base station 506b.

At decision step 508b, the change in C/I resulting from beam angle adjustment 512 is evaluated. If the C/I increased, then steps 512, 506b, and 508b are repeated, and are repeated until increasing the beam angle of the signal no longer results in a measurable increase in C/I, or results in a decrease in C/I. When one of these beam angle adjustments 512 results in a decreased C/I, the most recent beam angle adjustment is undone (reversed) 518. Step 518 restores the input signal beam angle to its state prior to the most recent beam angle adjustment.

After step 518, beamforming optimization for the selected subscriber station is concluded 520, and optimization is performed for the next subscriber station, if necessary.

Several variations of the described process are also anticipated by embodiments of the present invention. In an exemplary embodiment, each subscriber station transmits data rates, instead of detailed C/I measurements, to the serving base station. In mapping measured C/I values to data rates, there can be quantization error such that the same data rate is sent to the base station for a range of C/I values. It is desirable for the base station to transmit along a beam which corresponds not just to the highest data rate, but to the highest C/I value attainable. One embodiment of the invention, therefore, performs C/I measurements so as to identify the range of transmit beam angles corresponding to the highest data rate attainable for a subscriber station. Once this range is identified for a subscriber station, the base station uses the transmit beam angle at the center of that range to transmit to that subscriber station.

Although described in terms of C/I characterization of the forward link, one skilled in the art will recognized that the present invention may also be applied to reverse link C/I estimation without departing from the present invention.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus for transmitting a wireless signal comprising:
   a) at least two antenna transmission subsystems, each antenna transmission subsystem further comprising:
      1) means for generating a phase-controlled upconverted signal based on one of a plurality of phase control signals;
      2) amplifier, operably coupled to said means for generating, for amplifying said phase-controlled upconverted signal to produce an amplified signal; and
      3) transmit antenna, operably coupled to said amplifier, for sending said amplified signal through the air; and
   b) beamforming control processor for generating each of said plurality of phase control signals, wherein each of said phase control signals is based on a signal which is time-division-multiplexed, and providing said phase control signals to each of said at least one antenna transmission subsystem, slot timing generator, operably coupled with said beamforming control processor, for generating a slot timing signal and providing said slot timing signal to said beamforming control processor, and wherein said beamforming control processor varies said phase control signals based on said slot timing signal.

2. The apparatus of claim 1 wherein said beamforming control processor is further for storing a database of beamforming parameters corresponding to a plurality of subscriber stations, wherein said beamforming control processor generates said phase control signals based on a destination subscriber station for said amplified signal.

3. The apparatus of claim 2 wherein said beamforming control processor further provides an amplitude control signal to each of said means for generating based on said destination subscriber station, wherein each of said means for generating adjusts the amplitude of said phase-controlled upconverted signal based on said amplitude control signal.

4. The apparatus of claim 2 wherein said beamforming control processor is operably coupled to said amplifier of each of said antenna transmission subsystems, for providing an amplitude control signal to each of said amplifiers based on the contents of said database, wherein said amplifier adjusts the amplitude of said amplified signal based on said amplitude control signal.

5. The apparatus of claim 1 further comprising:
slot timing generator, operably coupled with said beamforming control processor, for generating a slot timing signal indicating a plurality of consecutive time slots, each said time slot comprising a data rate control (DRC) reference burst sub-slot and a data pilot burst sub-slot, and providing said slot timing signal to said beamforming control processor, wherein said beamforming control processor varies said phase control signals based on said DRC reference burst sub-slot and said data pilot burst sub-slot.

6. The apparatus of claim 1, wherein each of said means for generating a phase-controlled upconverted signal further comprises:
phase-controlled digital oscillator, operably coupled with said beamforming control processor, for receiving said phase control signal and producing a phase-controlled digital mixing signal based on said phase control signal; and
digital mixer, operably coupled with said phase-controlled digital oscillator, for mixing a digital data signal with said phase-controlled digital mixing signal to produce said phase-controlled upconverted signal.

7. The apparatus of claim 6 wherein said phase-controlled digital oscillator is a phase-controlled direct digital synthesizer (DDS).

8. The apparatus of claim 1, wherein each of said means for generating a phase-controlled upconverted signal further comprises:
first phase-controlled digital oscillator, operably coupled with said beamforming control processor, for receiving said phase control signal and producing first phase-controlled digital mixing signal having a phase offset based on said phase control signal;
second phase-controlled digital oscillator, operably coupled with said beamforming control processor, for receiving said phase control signal and producing second phase-controlled digital mixing signal having phase offset based on said phase control signal, wherein said second phase-controlled digital mixing signal is 90 degrees out of phase with said first phase-controlled digital mixing signal;
first digital mixer, operably coupled with said first phase-controlled digital oscillator, for mixing a first digital data signal with said first phase-controlled digital mixing signal to produce a first upconverted digital signal;
second digital mixer, operably coupled with said second phase-controlled digital oscillator, for mixing a second digital data signal with said second phase-controlled digital mixing signal to produce a second upconverted digital signal; and
digital summer, operably connected to said first and second digital mixers, for adding said first upconverted digital signal and second upconverted digital signal to produce said phase-controlled upconverted signal.

9. The apparatus of claim 8 wherein said first phase-controlled digital oscillator and said second phase-controlled digital oscillator are phase-controlled direct digital synthesizers (DDS).

10. The apparatus of claim 8 further comprising:
pseudonoise (PN) spreader, operably coupled to said first digital mixer and said second digital mixer,
for receiving an in-phase digital baseband signal and an in-phase PN signal and multiplying said in-phase digital baseband signal by said in-phase PN signal to produce said first digital data signal,
and for receiving a quadrature-phase baseband digital signal and a quadrature-phase PN signal and multiplying said quadrature-phase digital baseband signal by said quadrature-phase PN signal to produce said second digital data signal.

11. The apparatus of claim 8 further comprising:
complex pseudonoise (PN) spreader, operably coupled to said first digital mixer and said second digital mixer, for receiving in-phase and quadrature-phase components of a data stream, and performing complex PN spreading of said in-phase and quadrature-phase components of a data stream based on in-phase and quadrature-phase short PN spreading codes, to produce said first digital data signal and said second digital data signal.

12. The apparatus of claim 11 further comprising:
first baseband finite impulse response (FIR) filter, disposed between said complex PN spreader and said first digital mixer, for shaping the waveform of said first digital data signal; and
second baseband FIR filter, disposed between said complex PN spreader and said second digital mixer, for shaping the waveform of said second digital data signal.

13. The apparatus of claim 12 further comprising:
pseudonoise (PN) generator for generating in-phase and quadrature-phase samples of a PN code; and
PN despreader, operably coupled to said PN generator and to reference burst chip energy means and means for measuring average received energy, for receiving digital samples and performing PN despreading of said digital samples based on said in-phase and quadrature-phase samples to produce in-phase PN despread samples and quadrature-phase PN despread samples.

14. The apparatus of claim 13 wherein said means for estimating comprises:
first accumulator, operably connected to said slot timing controller and said PN despreader, for accumulating said in-phase PN despread samples received during said reference burst sub-slot indicated by said timing signals to produce an accumulated in-phase reference energy total;
second accumulator, operably connected to said slot timing controller and said PN despreader, for accumulating said quadrature-phase PN despread samples received during said reference burst sub-slot indicated by said timing signals to produce an accumulated quadrature-phase reference energy total; and
absolute value module, operably connected to said first and second accumulator, for squaring said in-phase reference energy total to produce a squared in-phase reference energy total and for squaring said quadrature-phase reference energy total to produce a squared quadrature-phase reference energy total and adding said squared in-phase reference energy total to said squared quadrature-phase reference energy total to produce said reference signal energy-per-chip.

15. The apparatus of claim 14 wherein said predetermined number of samples is 96.

16. The apparatus of claim 13 wherein said means for measuring average received energy comprises:
absolute value module, operably connected to said PN despreader, for calculating a sum-of-squares of each pair of despread samples consisting of one of said in-phase PN despread samples and one of said quadrature-phase PN despread samples, to produce-a stream of sum-of-squares samples; and accumulator, operably connected to said absolute value module and said slot timing controller, for accumulating said sum-of-squares samples received during said reference burst sub-slot, to produce said average received energy per chip.

17. The apparatus of claim 16 wherein said accumulator further divides said accumulated sum-of-squares samples received during said sub-slot by a predetermined number of samples in each said sub-slot.

18. The apparatus of claim 17 wherein said predetermined number of samples is 96.

19. An apparatus for transmitting a wireless signal comprising:
   a) slot timing generator, for generating a slot timing signal, said slot timing signal dividing time into time slots and sub-slots, wherein each of said slots comprises at least two sub-slots;
   b) beamforming control processor, operably coupled with said slot timing generator, for generating a plurality of transmit phase control signals wherein each of said phase control signals remains approximately constant within each of said at least two sub-slots; and
   c) a predetermined number of antenna transmission subsystems, each antenna transmission subsystem further comprising:
   c.1) means for generating a phase-controlled amplified signal, operably coupled with said beamforming control processor, for generating a phase-controlled amplified signal having a phase based on one of said plurality of transmit phase control signals; and
   c.2) transmit antenna, operably coupled to said means for generating,
   wherein, slot timing generator, operably coupled with said beamforming control processor, for generating said slot timing signal and providing said slot timing signal to said beamforming control processor, and wherein said beamforming control processor varies said phase control signals based on said slot timing signal.

20. The apparatus of claim 19 wherein each of said time slots has a fixed time slot duration.

21. The apparatus of claim 20 wherein said fixed time slot duration is equal to 1024 chips.

22. The apparatus of claim 20 wherein one of said at least two sub-slots is a data rate control (DRC) reference burst sub-slot having a fixed time offset from the beginning of each time slot, and having a fixed DRC reference burst duration.

23. The apparatus of claim 22 wherein said fixed DRC reference burst duration is 96 chips.

24. The apparatus of claim 22 wherein each of said time slots further comprises one or more data pilot burst sub-slots having a fixed data pilot burst sub-slot length.

25. The apparatus of claim 24 wherein fixed data pilot burst sub-slot length is equal to said fixed DRC reference burst duration is 96 chips.

26. The apparatus of claim 25 wherein said one or more data pilot burst sub-slots are later in each of said time slots than said fixed DRC reference burst sub-slot.

27. The apparatus of claim 19 wherein said beamforming control processor further provides an amplitude control signal to each of said means for generating, and wherein the amplitude of said phase-controlled amplified signal varies based on said amplitude control signal.

28. The apparatus of claim 19 wherein each of said means for generating a phase-controlled amplified signal further comprises:

phase-controlled digital oscillator, operably coupled with said beamforming control processor, for receiving said phase control signal and producing a phase-controlled digital mixing signal based on said phase control signal;

digital mixer, operably coupled with said phase-controlled digital oscillator, for mixing a digital data signal with said phase-controlled digital mixing signal to produce an upconverted digital signal; and amplifier, operably coupled with said DAC, for amplifying said phase-controlled upconverted signal to produce said phase-controlled amplified signal.

29. The apparatus of claim 28 wherein said phase-controlled digital oscillator is a phase-controlled direct digital synthesizer (DDS).

30. The apparatus of claim 28 wherein each of said means for generating a phase-controlled amplified signal further comprises:

first and second phase-controlled digital oscillators, operably coupled with said beamforming control processor, for receiving said phase control signal and producing first and second phase-controlled digital mixing signals based on said phase control signal, wherein said second phase-controlled digital mixing signal is 90 degrees out of phase with said first phase-controlled digital mixing signal;

first digital mixer, operably coupled with said first phase-controlled digital oscillator, for mixing a first digital data signal with said first phase-controlled digital mixing signal to produce a first upconverted digital signal;

second digital mixer, operably coupled with said second phase-controlled digital oscillator, for mixing a second digital data signal with said second phase-controlled digital mixing signal to produce a second upconverted digital signal;

digital summer, operably connected to said first and second digital mixers, for adding said first upconverted digital signal and second upconverted digital signal to produce a phase-controlled upconverted signal.

31. The apparatus of claim 30 wherein said first phase-controlled digital oscillator and said second phase-controlled digital oscillator are phase-controlled direct digital synthesizers (DDS).

32. The apparatus of claim 30 further comprising:
pseudonoise (PN) spreader, operably coupled to said first digital mixer and said second digital mixer,
for receiving an in-phase digital baseband signal and an in-phase PN signal and multiplying said in-phase digital baseband signal by said in-phase PN signal to produce said first digital data signal,
and for receiving a quadrature-phase baseband digital signal and a quadrature-phase PN signal and multiplying said quadrature-phase digital baseband signal by said quadrature-phase PN signal to produce said second digital data signal.

33. The apparatus of claim 30 further comprising:
complex pseudonoise (PN) spreader, operably coupled to said first digital mixer and said second digital mixer, for receiving in-phase and quadrature-phase components of a complex data stream and in-phase and quadrature-phase short PN spreading codes, and performing complex PN spreading of said complex data stream based on said in-phase and quadrature-phase short PN spreading codes, to produce said first digital data signal and said second digital data signal.

34. The apparatus of claim 33 further comprising:

first baseband finite impulse response (FIR) filter, disposed between said complex PN spreader and said first digital mixer, for shaping the waveform of said first digital data signal; and second baseband FIR filter, disposed between said complex PN spreader and said second digital mixer, for shaping the waveform of said second digital data signal.

35. The apparatus of claim 19 wherein said predetermined number is two.

* * * * *